(12) United States Patent
Boettger et al.

(10) Patent No.: US 10,703,178 B2
(45) Date of Patent: Jul. 7, 2020

(54) WINDSHIELD WRAPPED VEHICLE PILLAR

(71) Applicant: FORD GLOBAL TECHNOLOGIES, LLC, Dearborn, MI (US)

(72) Inventors: Thomas F. Boettger, Dearborn, MI (US); Michael A. Musleh, Canton, MI (US); Patrick Reed, Livonia, MI (US); Jennifer Ann Gauthier, Fenton, MI (US); David C. Allen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/344,873

(22) Filed: Nov. 7, 2016

(65) Prior Publication Data
US 2018/0126826 A1    May 10, 2018

(51) Int. Cl.
*B60J 1/00* (2006.01)
*B60J 1/02* (2006.01)
*B60J 10/34* (2016.01)
*B62D 25/04* (2006.01)

(52) U.S. Cl.
CPC ............ *B60J 1/008* (2013.01); *B60J 1/006* (2013.01); *B60J 1/02* (2013.01); *B60J 10/34* (2016.02); *B62D 25/04* (2013.01)

(58) Field of Classification Search
CPC ................................... B60J 10/70; B60J 1/10
USPC ..... 296/193.06, 1.08, 203.02, 39.1; 52/716.5
See application file for complete search history.

(56) References Cited

U.S. PATENT DOCUMENTS

| 1,439,919 | A | * | 12/1922 | Snell | B62D 29/02 296/201 |
| 3,114,571 | A | * | 12/1963 | Leflet, Jr. | B60J 1/02 296/84.1 |
| 5,360,253 | A | * | 11/1994 | Sasaki | B62D 35/007 296/180.1 |

(Continued)

FOREIGN PATENT DOCUMENTS

| CN | 102530097 A | 7/2012 |
| CN | 204955650 U | 1/2016 |

OTHER PUBLICATIONS

English Machine Translation of CN102530097A.
English Machine Translation of CN204955650U.

*Primary Examiner* — D Glenn Dayoan
*Assistant Examiner* — Sunsurraye Westbrook
(74) *Attorney, Agent, or Firm* — David Coppiellie; King & Schickli, PLLC

(57) ABSTRACT

A vehicle includes a driver side pillar extending between a door and a roof. The pillar forms a face having an outer edge adjacent the driver side door and an inner edge. Similarly, a passenger side pillar extends between a door and the roof and forms a face having an outer edge adjacent the door and inner edge. A windshield supported by a cowl and the roof has a driver side edge that extends beyond the inner edge of the driver side face and substantially covers the driver side pillar and a passenger side edge that extends beyond the inner edge of the passenger side face and substantially covers the passenger side pillar. The vehicle further includes a frit bonded around a periphery of the windshield. The frit substantially covers and is bonded to the driver and passenger side pillars making them appear to be a dark or black color.

17 Claims, 6 Drawing Sheets

(56) References Cited

U.S. PATENT DOCUMENTS

| | | | | |
|---|---|---|---|---|
| 5,695,236 A * | 12/1997 | Banno | ............... | B60J 1/005 |
| | | | | 296/201 |
| 5,887,393 A * | 3/1999 | Vanark | ............... | B60J 1/10 |
| | | | | 296/146.15 |
| 6,179,359 B1 * | 1/2001 | Clauson | ............ | B60R 13/0206 |
| | | | | 296/203.02 |
| 6,634,695 B2 * | 10/2003 | Campfield | ........ | B32B 17/10018 |
| | | | | 296/95.1 |
| 7,845,713 B2 * | 12/2010 | Terai | ............... | B60J 1/10 |
| | | | | 296/193.06 |
| 7,879,278 B2 * | 2/2011 | Hanai | ............ | B29C 70/763 |
| | | | | 264/118 |
| 8,348,321 B2 * | 1/2013 | Yamazaki | ............ | B60R 13/06 |
| | | | | 296/1.08 |
| 8,910,987 B1 | 12/2014 | Greggs | | |
| 2010/0237661 A1 * | 9/2010 | Baccouche | ............ | B62D 25/04 |
| | | | | 296/210 |
| 2018/0001942 A1 * | 1/2018 | Milton | ............... | B60G 3/06 |

* cited by examiner

WINDSHIELD WRAPPED VEHICLE PILLAR

TECHNICAL FIELD

This document relates generally to vehicle pillars, and more specifically to a windshield wrapped A pillar.

BACKGROUND

The A-pillar of a vehicle is the front most pillar or vertical support on a vehicle. All vehicle pillars are located around vehicle glass and operate to hold the glass in place and add structural integrity primarily to the roof of the vehicle. The A-pillar generally holds the windshield in place along driver and passenger side edges. Recent design trends following customer preferences indicate a desire for the A-pillar to appear dark or black in color such that the roof appears to be floating. To achieve the desired appearance, factory installed pillars are commonly covered. This has historically been achieved in three different ways.

First, the A-pillar is masked off and painted black after the vehicle is painted its original color. This approach, however, is time and labor intensive and perhaps most importantly requires a significant amount of additional painting facilities. Together, these additional requirements slow production and increase manufacturing costs. Second, black tape or the like is added to the A-pillar. While sufficient to create the desired black colored pillars, application of the tape is limited to certain contours and is also time and labor intensive. Even more, the tape may not be very robust in the field.

Third, a black colored applique is added. Typically, the applique is mounted to a bracket that is itself mounted to the A-pillar. Mounting the bracket to the A-pillar, however, is not without issues because the A-pillar is characteristically designed to be small and compact, and developing and packaging fasteners sufficient to hold the applique is challenging. The design issues are further complicated by recent increases in roof strength requirements that dictate the use of metal tubes to stiffen the A-pillars. Maintaining clearance for applique fasteners when using the metal tubes or the like is difficult.

Even more, post applied appliques are known to suffer from significant wind noise and/or retention issues. While the use of added epoxy adhesive can significantly reduce, if not eliminate, such issues, the additional adhesive increases the cost of manufacturing. The additional appliques and brackets also contribute to increases in manufacturing costs and add approximately 1.2 Kg to the overall weight of the vehicle. In addition, the appliques limit the range of travel of the windshield wipers as the wiper blades have to stop approximately 50 mm short of the applique to prevent contact with the applique. The result is that the wiper blades do not clear the windshield all the way to the A-pillars.

Accordingly, a need exists for a way to provide the customer with a blacked out A-pillar while overcoming the noted drawbacks associated with painting, taping and/or adding an applique, i.e., without reducing quality (e.g., through the introduction of wind noise due to a loose applique or a missing applique), increasing the cost or weight of the vehicle, and/or while maintaining at least the required strength in the pillar. One way to meet these needs is extending edges of the windshield at least partially over the A-pillars.

SUMMARY

In accordance with the purposes and benefits described herein, a vehicle having a windshield that wraps around the vehicle's A-pillars is provided. The vehicle may be broadly described as comprising a door, a roof, a windshield supported along a lower edge by a cowl and along an upper edge by the roof, and a pillar extending between the door and the roof and supporting the windshield. The side edge of the windshield extends around and substantially covers the pillar.

In another possible embodiment, the pillar includes a face having an outer edge adjacent the door and an inner edge.

In yet another possible embodiment, the vehicle further includes a frit around a periphery of the windshield. In still another, the frit is sufficient in width to substantially cover the face of the pillar. In still yet another, the frit is black.

In one other possible embodiment, the frit is bonded to the windshield.

In still another possible embodiment, the vehicle further includes an end treatment bonded to the side edge of the windshield. In another possible embodiment, a margin is formed between the windshield, the pillar, and the end treatment.

In accordance with an additional aspect, a vehicle includes a windshield bonded to a first pillar extending between a first door and a roof and to a second pillar extending between a second door and the roof, wherein a first side edge of the windshield extends around the first pillar and a second side edge of the windshield extends around the second pillar.

In one other possible embodiment, the first pillar includes a first face having an outer edge adjacent the first door and an inner edge, and the second pillar includes a second face having an outer edge adjacent the second door and an inner edge.

In another possible embodiment, the vehicle further includes a frit around a periphery of the windshield. In still another possible embodiment, the frit covers the first face of the first pillar and the second face of the second pillar. In yet still another, the frit is bonded to the face of the first pillar and the face of the second pillar.

In still another possible embodiment, the windshield includes an outer ply, an inner ply, and a polymer between the inner and outer plies, and the frit is bonded to an inner surface of the outer ply.

In accordance with another aspect, a vehicle includes a driver side pillar extending between a driver side door and a roof, the driver side pillar forming a face having an outer edge adjacent the driver side door and an inner edge, a passenger side pillar extending between a passenger side door and a roof, the passenger side pillar forming a face having an outer edge adjacent the passenger side door and an inner edge, and a windshield having a driver side edge extending beyond the inner edge of the driver side face and substantially covering the driver side pillar and a passenger side edge extending beyond the inner edge of the passenger side face and substantially covering the passenger side pillar.

In another possible embodiment, the vehicle further includes a frit bonded on a first side to the window and substantially covering at least the driver side pillar and the passenger side pillar and bonded on a second side to the face of the driver side pillar and the face of the passenger side pillar.

In yet another possible embodiment, the vehicle further includes a driver side trim extending along and bonded to the driver side edge of the windshield and a passenger side trim extending along and bonded to the passenger side edge of the windshield.

In one other possible embodiment, a driver side margin is formed by the frit, the face of the driver side pillar, and the driver side trim, and a passenger side margin is formed by the frit, the face of the passenger side pillar, and the passenger side trim.

In still another possible embodiment, the windshield includes an outer ply, an inner ply, and a polymer between the inner and outer plies, and a frit is bonded to an inner surface of the outer ply. In another, the windshield is less than 3.7 mm thick.

In the following description, there are shown and described several preferred embodiments of a vehicle having a windshield that wraps around the vehicle's A-pillars to provide a desired aesthetic look while lowering manufacturing costs and reducing wind related noise, and improving the overall aerodynamics of the vehicle. As it should be realized, the vehicles are capable of other, different embodiments and their several details are capable of modification in various, obvious aspects all without departing from the concepts as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle with wrap-around windshield and together with the description serve to explain certain principles thereof. In the drawing figures.

Reference will now be made in detail to the present embodiments of the vehicle with wrap-around windshield, examples of which are illustrated in the accompanying drawing figures, wherein like numerals are used to represent like elements.

DETAILED DESCRIPTION

Figure 1:
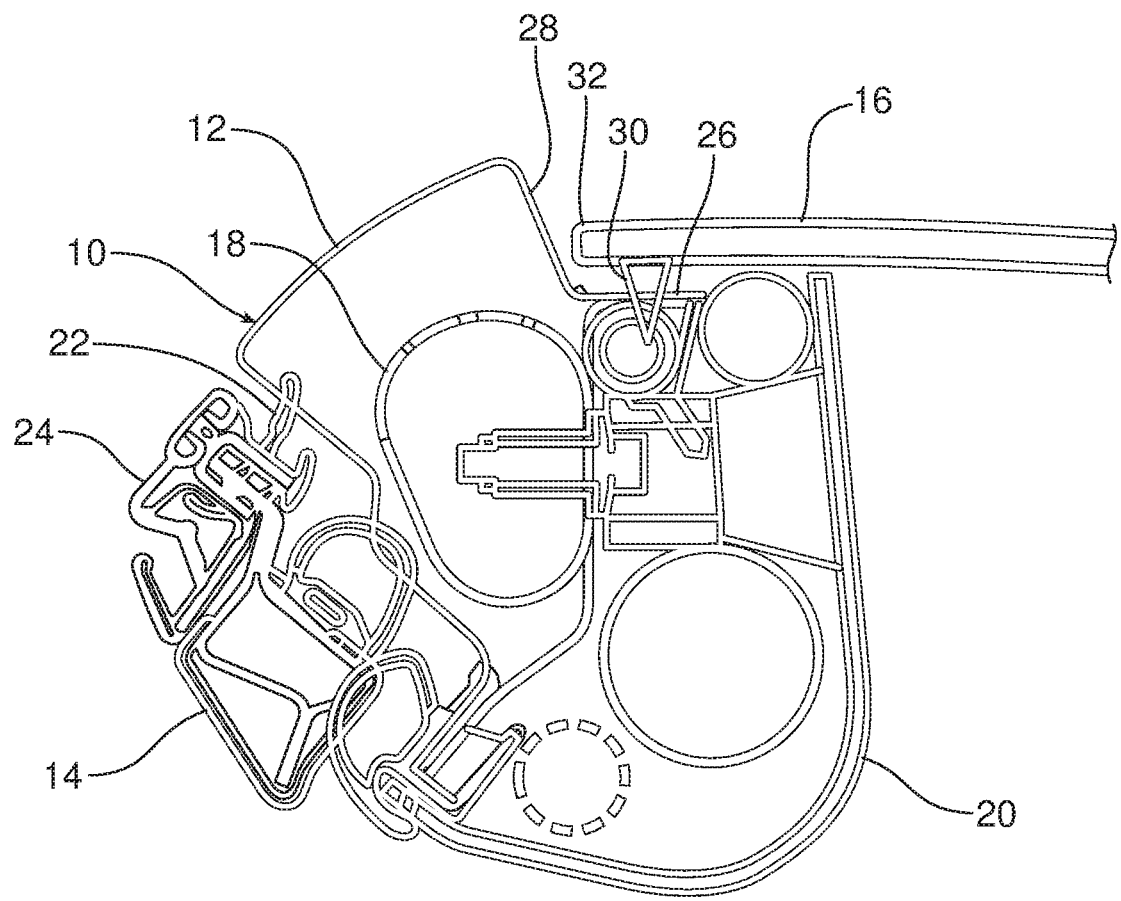
FIG. 1 is a partial cross-sectional view of a prior art A-pillar with the windshield extending to a side of the A-pillar which is painted black after assembly.

Reference is now made to FIG. 1 which illustrates a prior art embodiment of a vehicle having an A-pillar 10. In this embodiment, a face 12 of the A-pillar 10 extends between a door 14 and a windshield 16 and is visually exposed. A dark or black tape or paint is applied to at least the face 12 of the A-pillar 10 to provide the desired aesthetics as described above. As shown, the A-pillar 10 includes a hydroform tube 18 which is mounted to a body 20 of the vehicle. The door 14 is shown in a closed position adjacent the A-pillar 10 and a seal 22 is attached to the door and seals the gap between the A-pillar and the door. An outer trim 24 at least partially covers the door seal 22. The windshield 16 extends over and is bonded to a tab 26 extending from a side 28 of the A-pillar 10 using an epoxy 30 or other adhesive. As shown, an edge 32 of the windshield 16 generally abuts the side 28 of the A-pillar 10.

Figure 2:
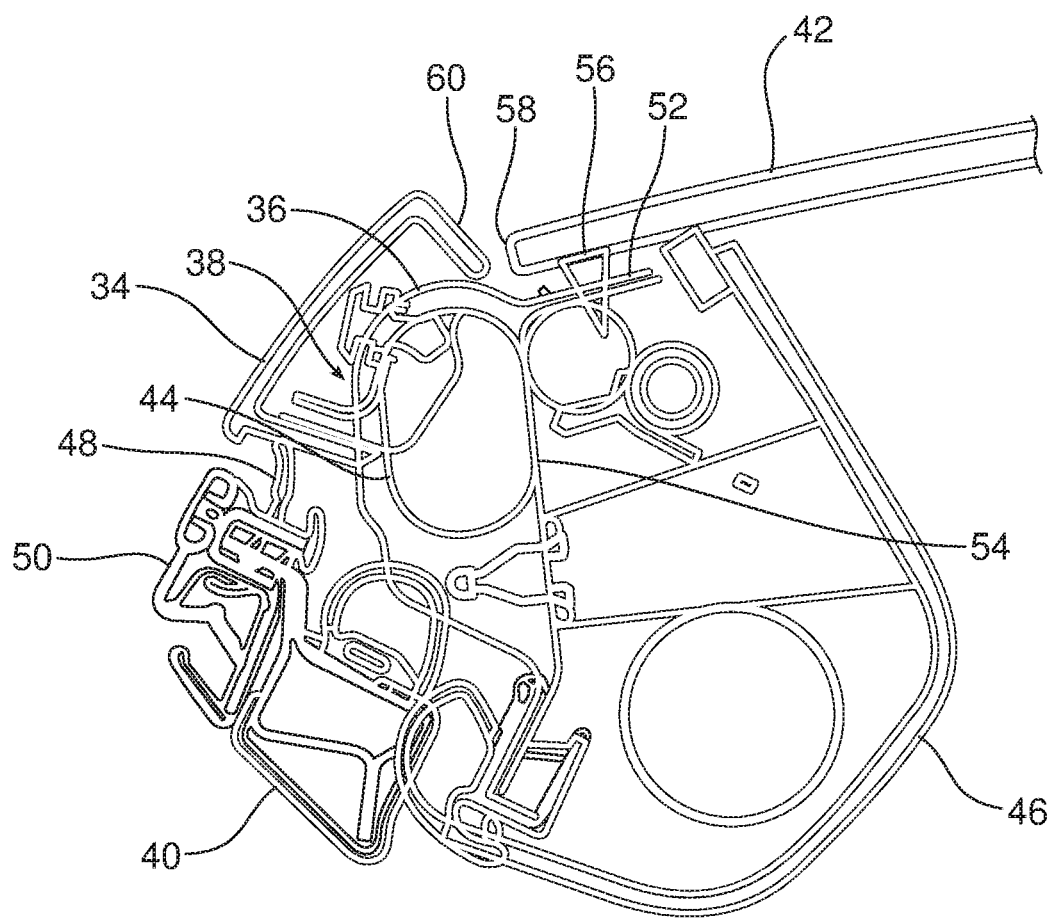
FIG. 2 is a partial cross-sectional view of a prior art A-pillar with the windshield extending to a side of the A-pillar which is covered by an applique.

In a second prior art embodiment, shown in FIG. 2, an applique 34 is secured in position over a face 36 of an A-pillar 38. The face 36 of the A-pillar 38 extends between a door 40 and a windshield 42. Rather than apply tape or paint to the face 36 of the A-pillar 38, the applique 34 covers the untreated pillar and provides the desired aesthetics. As shown, the A-pillar 38 includes a hydroform tube 44 which is mounted to a body 46 of the vehicle. The door 40 is depicted in a closed position adjacent the A-pillar 38 and a seal 48 is attached to the door and seals the gap between the applique 34 and the door. An outer trim 50 at least partially covers the door seal 48. The windshield 42 extends over and is bonded to a tab 52 extending from a side 54 of the A-pillar 38 using an epoxy 56 or other adhesive. An edge 58 of the windshield 42 generally abuts the side 54 of the A-pillar 38 and a side 60 of the applique 34.

Figure 3:
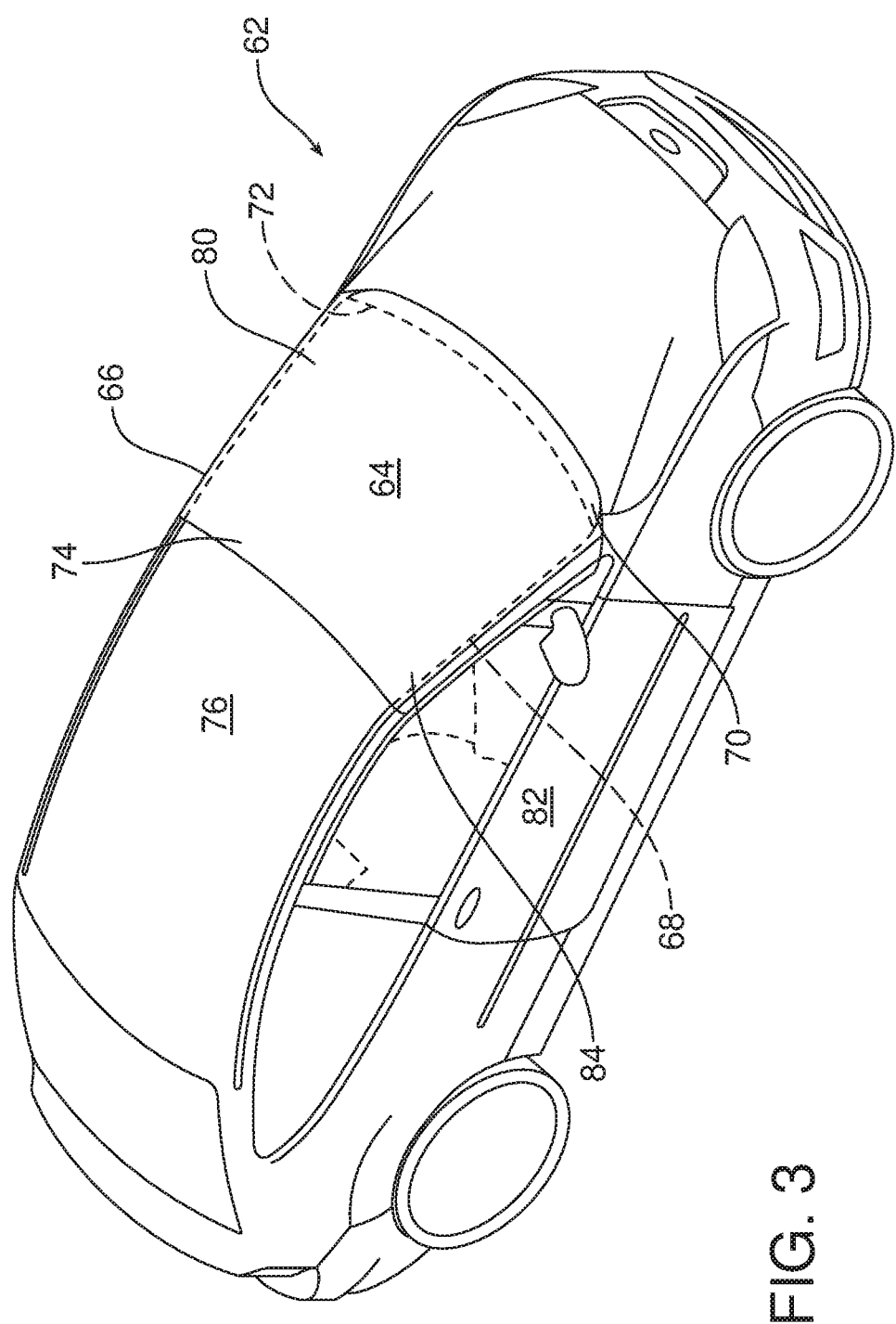
FIG. 3 is a perspective view of a vehicle.

Reference is now made to FIG. 3 showing an embodiment of a vehicle 62 having a windshield 64 that extends around driver and passenger side A-pillars 66, 68. As shown, the windshield 64 is supported along a lower edge 70 by a cowl 72 and along an upper edge 74 by a roof 76. The first, or driver side, A-pillar 66 extends between a driver side door 78 and the roof 76 and supports a driver side edge 80 of the windshield 64. A second, or passenger side, A-pillar 68 similarly extends between a passenger side door 82 and the roof 76 and supports a passenger side edge 84 of the windshield 64. It should be noted that references to edges of the windshield (e.g., driver side edge 80) refers to a portion of a face or a rear face of the windshield adjacent a side of the windshield, the line where the face meets the side, and/or the side of the windshield).

Figure 4:
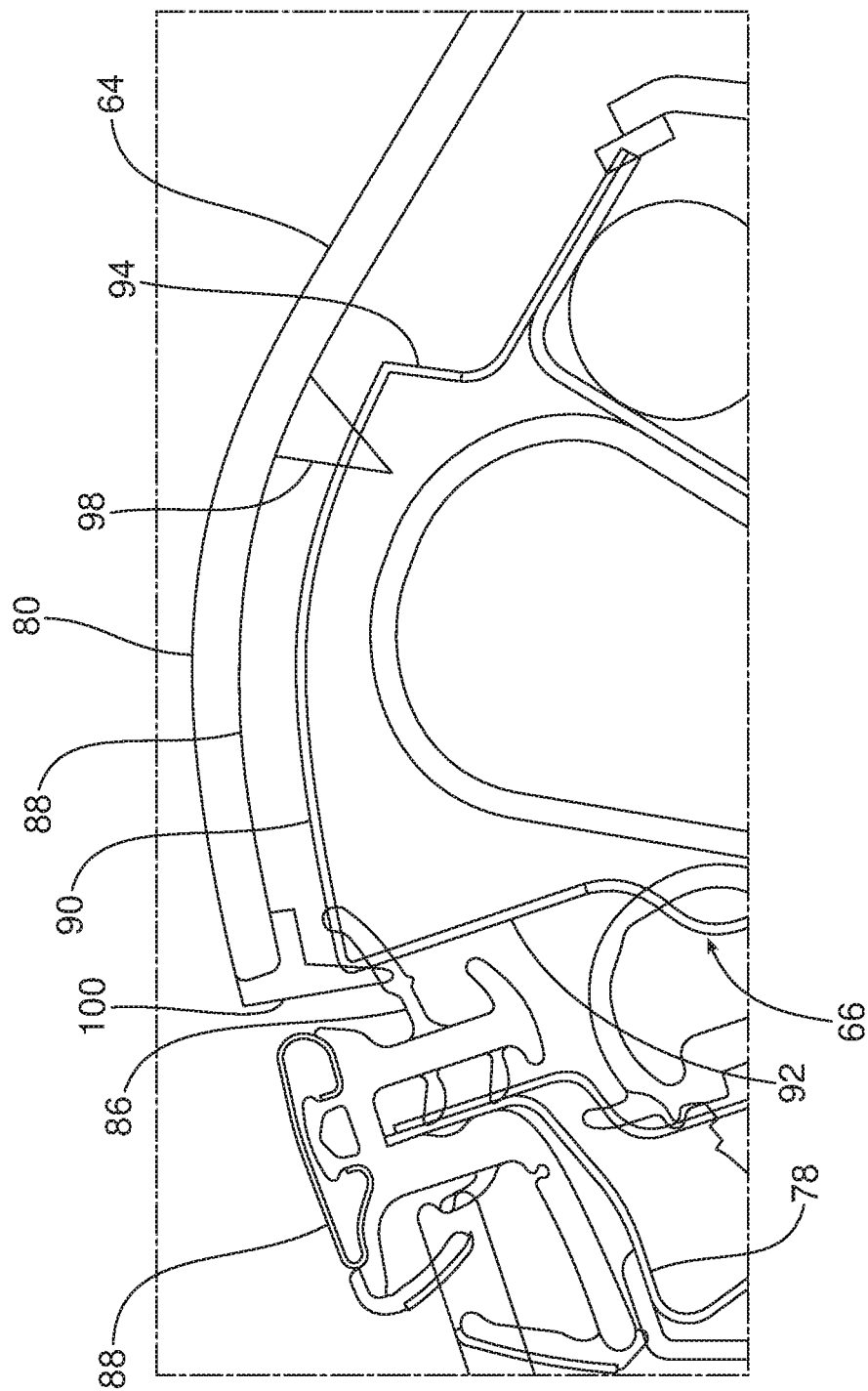
FIG. 4 is a partial cross-sectional view of an A-pillar with the windshield extending over a face of the A-pillar.

As shown in FIG. 4, a seal 86 covered by a chrome trim 88 is positioned between the door 78 and A-pillar 66 and the windshield 64 extends around and substantially covers a face 90 of the A-pillar 66 in the described embodiment. The face 90 includes an outer edge 92 adjacent the door 78 and an inner edge 94. Although only the driver side A-pillar 66 is shown in FIG. 4, the windshield 64 similarly extends around and substantially covers a face 96 of the passenger side A-pillar 68 as shown in FIG. 5.

The windshield 64 is bonded, by epoxy or the like, to the face 90 of the A-pillar 66 at bonding point 98. Compared to the prior art vehicles described above, the location of the bonding point 98 is moved from a tab 26 extending from a side 28 of the pillar 12 (shown in FIG. 1) to the face 90 of the pillar 66 (shown in FIG. 4). The movement of the bonding point eliminates a margin created by bonding the windshield 16 to the tab 26 extending from the side 28 of the pillar 12 shown in FIG. 1, and significantly improves the aerodynamics of the vehicle 62. Improving the aerodynamics decreases wind noise thereby eliminating the need for an applique or other remedy to minimize the effects of the margin.

Moving the bonding point 78 also creates a new margin between the windshield 64 and the face 90 of the A-pillar 66 as shown in FIG. 4. In order to maintain the improved aerodynamics of the vehicle 62 secured through moving the bonding point 78, an end treatment 100 is bonded to the windshield 64. The end treatment 100 is an injection molded plastic in the described embodiment but other materials (e.g., other hard rubbers or high durometer materials) may be utilized. The end treatment 100 seals the gap between the edge 80 of the windshield 64 and the face 90 of the A-pillar 66 and provides a flange that the door 78 utilizes for sealing.

Figure 5:
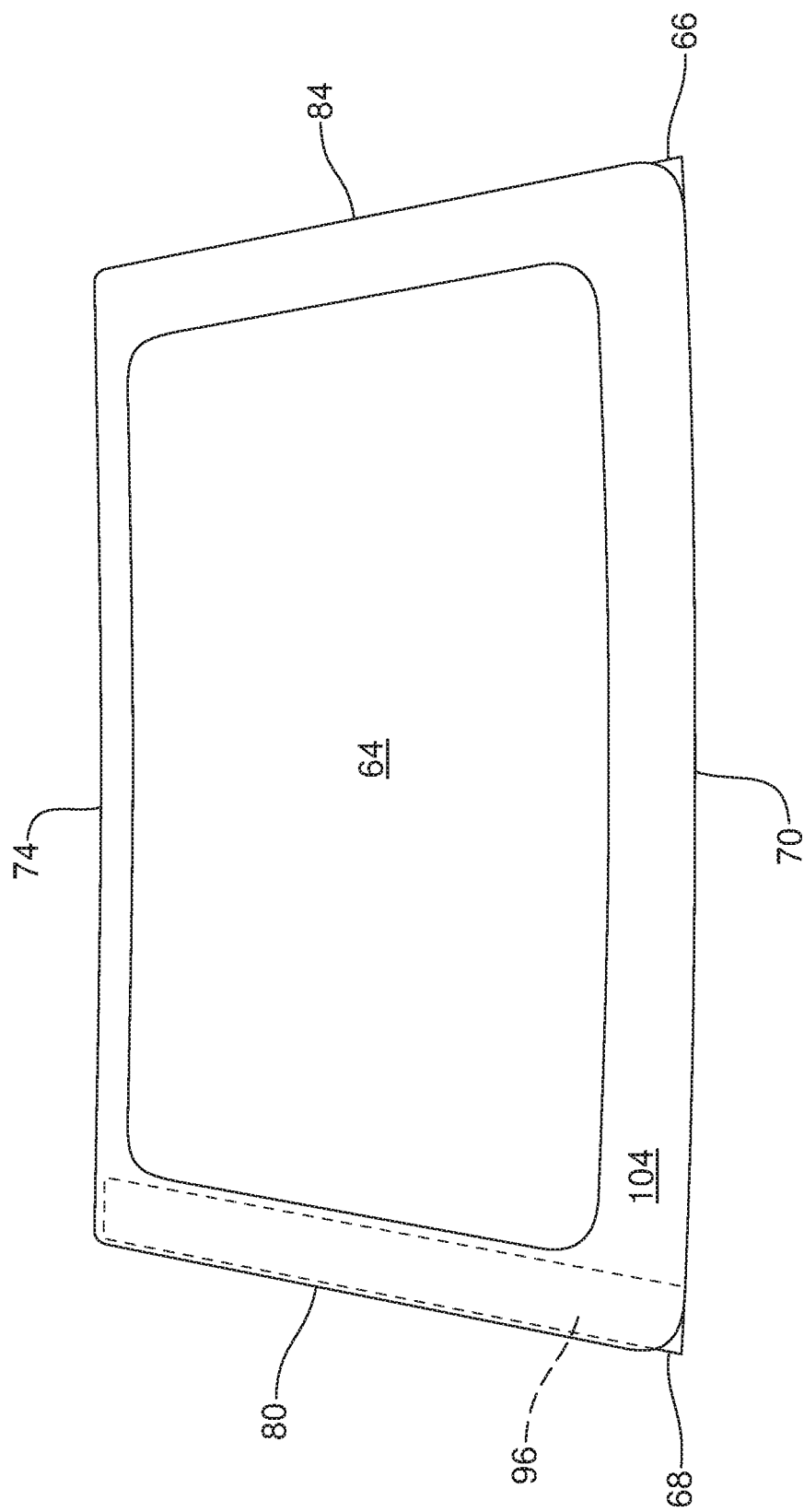
FIG. 5 is a windshield having a frit bonded around a periphery.

As shown in FIG. 5, the windshield 64 in the described embodiment includes a frit 104 bonded around a periphery of the windshield. The frit 104, which is black in color, is sufficient in width to substantially cover the face 90 of the A-pillar 66 as shown in FIG. 4. In this manner, the face 90 of the A-pillar 66 appears black to an observer located outside of the vehicle 62.

Figure 6:
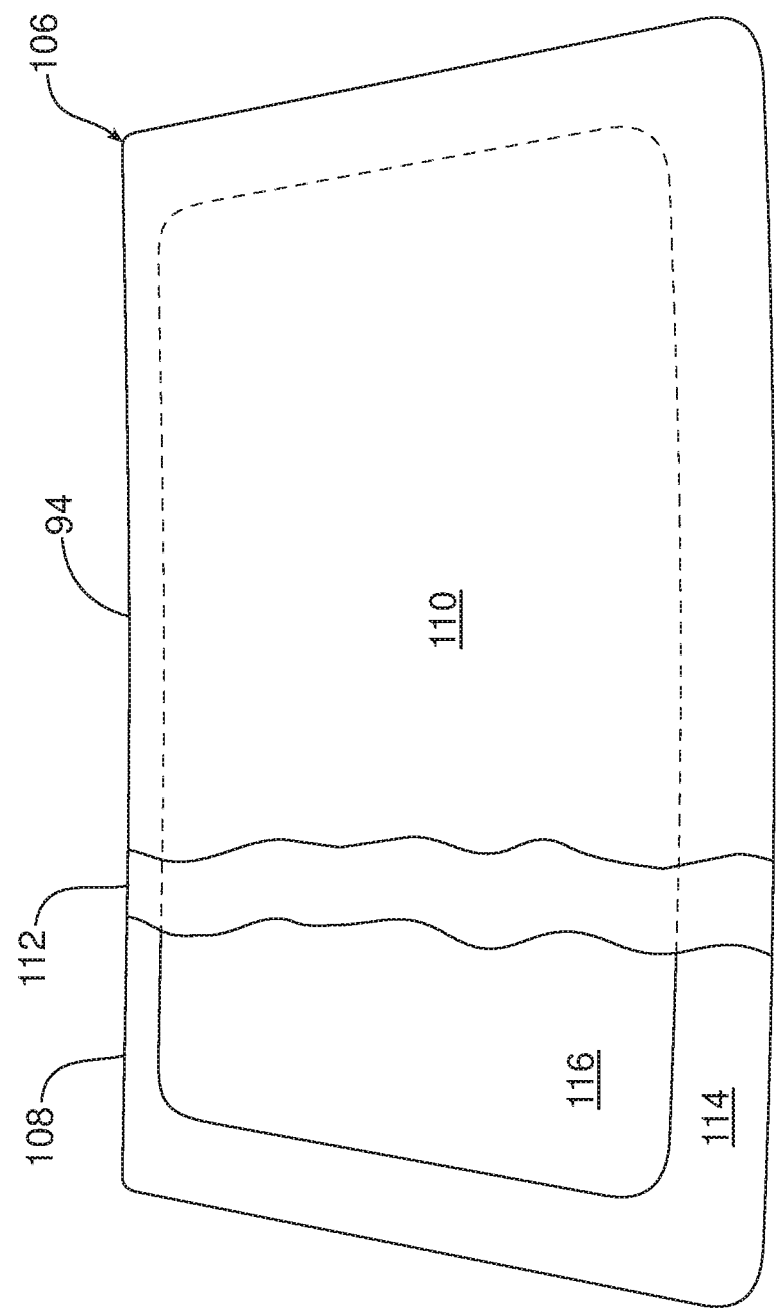
FIG. 6 is an alternate embodiment of a multi-ply windshield.

In an alternate embodiment shown in FIG. 6, a windshield 106 includes an outer ply 108, an inner ply 110, and a polymer 112 between said inner and outer plies. In this embodiment, a frit 114 is bonded to an inner surface 116 of the outer ply 108 and the inner ply 110 is a chemically strengthened glass (e.g., glass sold under the registered trademark Gorilla). The utilization of chemically strengthened glass allows for a thinner inner ply to be utilized which reduces the overall weight of the windshield 106. In the described embodiment, the windshield 106 has a thickness less than 3.7 mm.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle, comprising:
   a door;
   a roof;
   a pillar;
   a windshield supported along a lower edge by a cowl, an upper edge by the roof, and a side edge by the pillar; and
   an end treatment bonded to the side edge of the windshield,
   wherein the side edge of the windshield substantially covers and is bonded to a face of the pillar, and wherein a gap is formed between the side edge of the windshield and the face of the pillar, and the end treatment seals the gap.

2. The vehicle of claim 1, wherein the face of the pillar includes an outer edge adjacent the door and an inner edge.

3. The vehicle of claim 2, wherein the side edge of the windshield is bonded to the face of the pillar adjacent the inner edge of the pillar.

4. The vehicle of claim 1, further comprising a frit around a periphery of the windshield.

5. The vehicle of claim 4, wherein the frit is sufficient in width to substantially cover the face of the pillar.

6. The vehicle of claim 4, wherein the frit is bonded to the windshield.

7. The vehicle of claim 4 wherein the windshield includes an outer ply, an inner ply, and a polymer between the inner and outer plies, and the frit is bonded to an inner surface of the outer ply.

8. A vehicle, comprising:
   a windshield bonded to a face of a first pillar extending between a first door and a roof and to a face of a second pillar extending between a second door and the roof, wherein a first side edge of the windshield extends around the first pillar and a second side edge of the windshield extends around the second pillar; and
   a first end treatment bonded to the first side edge of the windshield and a second end treatment bonded to the second side edge of the windshield.

9. The vehicle of claim 8, wherein the face of the first pillar includes an outer edge adjacent the first door and an inner edge, and the face of the second pillar includes an outer edge adjacent the second door and an inner edge.

10. The vehicle of claim 9, wherein the first side edge of the windshield is bonded to the face of the first pillar adjacent the inner edge of the first pillar and the second side edge of the windshield is bonded to the face of the second pillar adjacent the inner edge of the second pillar.

11. The vehicle of claim 10, further comprising a frit around a periphery of the windshield.

12. The vehicle of claim 11, wherein the frit covers the first face of the first pillar and the second face of the second pillar.

13. A vehicle, comprising:
    a driver side pillar extending between a driver side door and a roof, the driver side pillar forming a face having an outer edge adjacent the driver side door and an inner edge;
    a passenger side pillar extending between a passenger side door and the roof, the passenger side pillar forming a face having an outer edge adjacent the passenger side door and an inner edge;
    a windshield having a driver side edge extending beyond the inner edge of the driver side face and substantially covering the driver side pillar and a passenger side edge extending beyond the inner edge of the passenger side face and substantially covering the passenger side pillar; and
    a driver side end treatment bonded to the driver side edge of the windshield and a passenger side end treatment bonded to the passenger side edge of the windshield,
    wherein the driver side edge of the windshield is bonded to the face of the driver side pillar and the passenger side edge of the windshield is bonded to the face of the passenger side pillar.

14. The vehicle of claim 13, further comprising a frit bonded on a first side to the windshield and substantially covering at least the driver side pillar and the passenger side pillar and bonded on a second side to the face of the driver side pillar and the face of the passenger side pillar.

15. The vehicle of claim 13, wherein the windshield includes an outer ply, an inner ply, and a polymer between the inner and outer plies, and the frit is bonded to an inner surface of the outer ply.

16. The vehicle of claim 15, wherein the windshield is less than 3.7 mm in thickness.

17. The vehicle of claim 13, wherein a gap is formed between the driver side side edge of the windshield and the face of the driver side pillar, and the driver side end treatment seals the gap.

* * * * *